H. O. BISBING.
GLASS MOLDING MACHINE.
APPLICATION FILED SEPT. 26, 1919.
1,347,202.
Patented July 20, 1920.
2 SHEETS—SHEET 1.
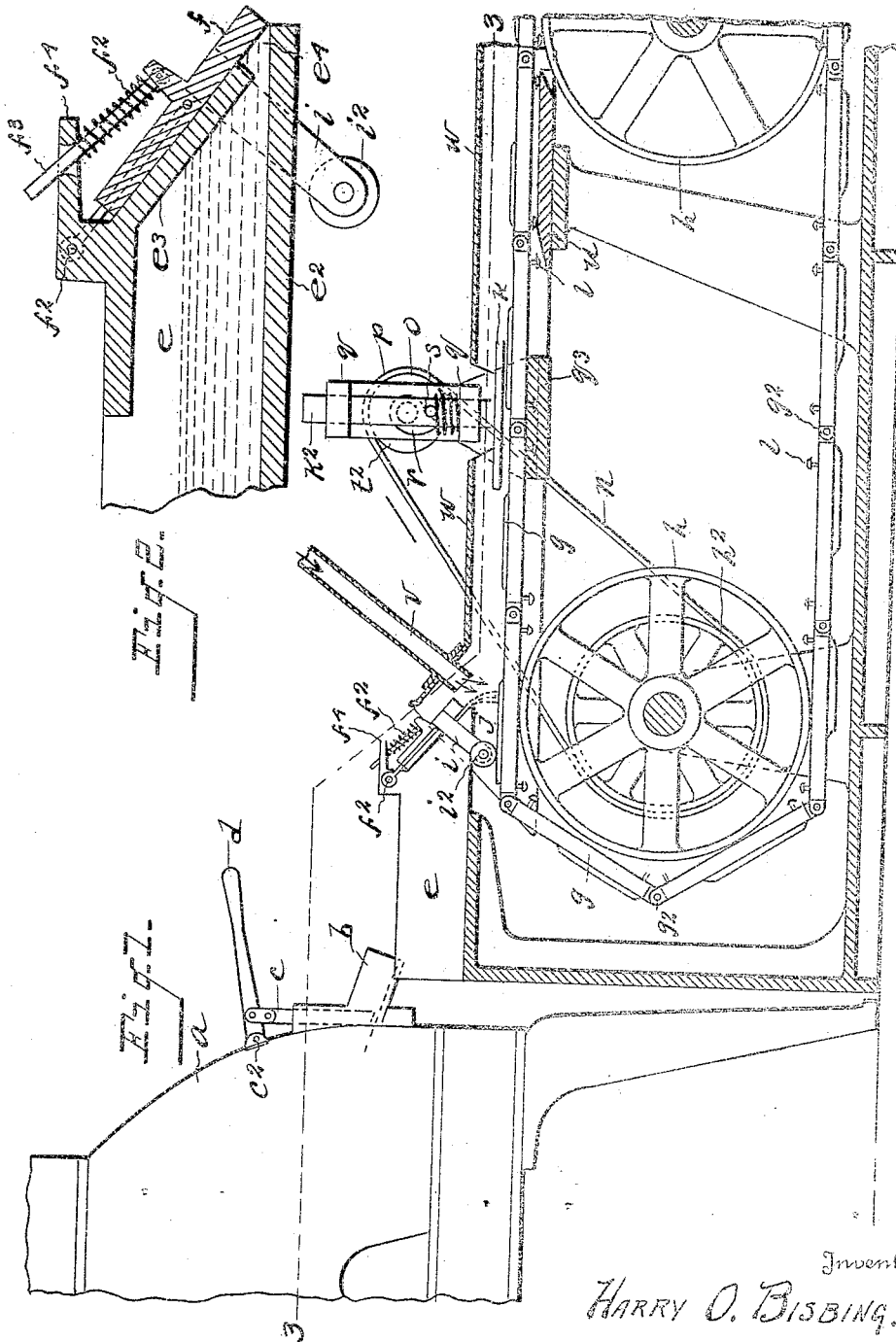
Inventor
HARRY O. BISBING.
By Raymond A. Parker
Attorney

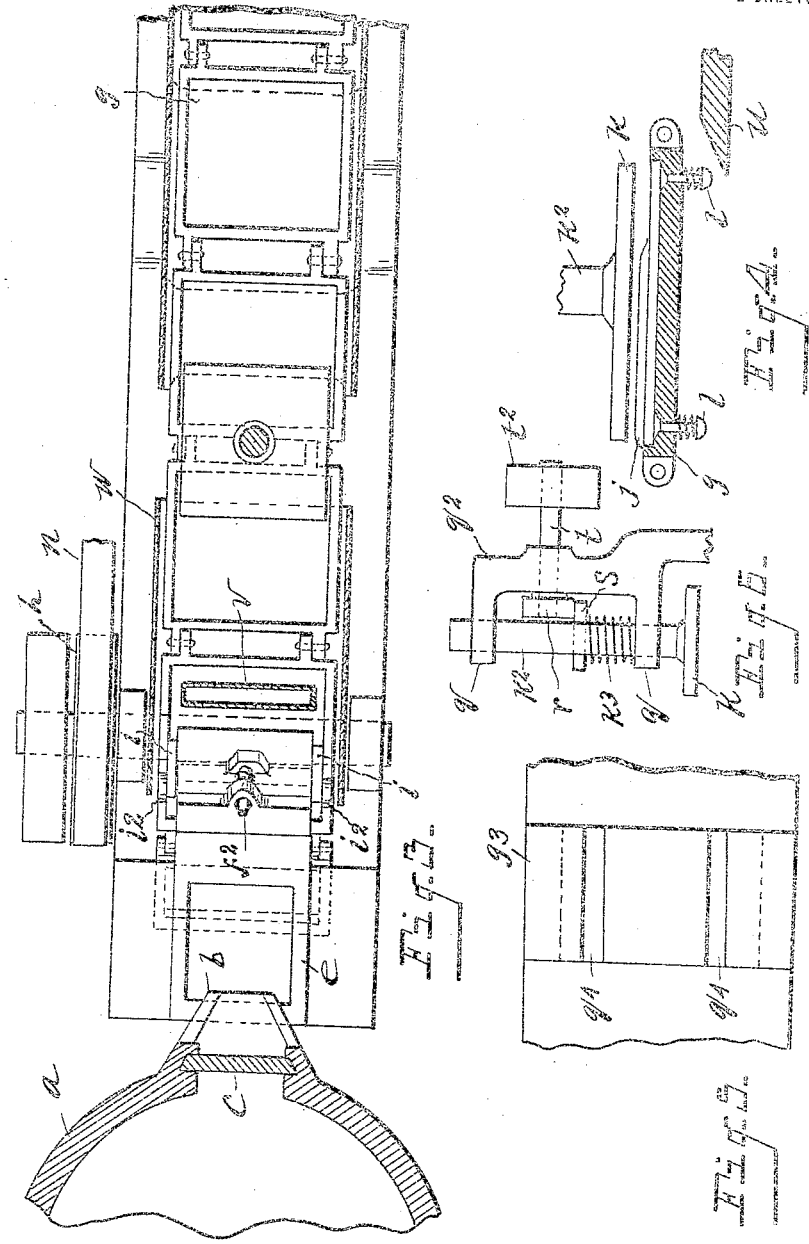

UNITED STATES PATENT OFFICE.

HARRY O. BISBING, OF DETROIT, MICHIGAN.

GLASS-MOLDING MACHINE.

1,347,202.

Specification of Letters Patent.  Patented July 20, 1920.

Application filed September 26, 1919. Serial No. 326,513.

*To all whom it may concern:*

Be it known that I, HARRY O. BISBING, who am a citizen of the United States, residing at Detroit, county of Wayne, State of Michigan, have invented a certain new and useful Improvement in Glass-Molding Machines, and declare the following to be a full, clear, and exact description of the same, such as will enable others skilled in the art to which it pertains to make and use the same, reference being had to the accompanying drawings, which form a part of this specification.

My invention relates to glass-making and particularly to the molding of plate glass and consists in mechanism for automatically delivering glass to a series of traveling containers or molds, molding the glass into desired form while in such containers, automatically removing the molded glass from such container for delivery to an annealing furnace and means for maintaining desired temperature of the glass during such operation and for maintaining desired temperature of the containers.

This application shows an improvement in the mechanism set forth in my application for patent dated March 8, 1919, Serial Number 281,341.

The object of my device is to provide mechanical means for molding plate glass in such form as to avoid the costly operations connected with glass grinding which is a necessary part of the manufacture as now practised. A further object is to provide means for stamping or molding the glass into uniform thickness. A further object is to provide means for keeping the glass while in the mold at a desired temperature. A still further object is to provide means for maintaining a desired temperature in the series of traveling glass molds.

In the drawings,—

Figure 1 is a side elevation of my device in connection with a glass furnace.

Fig. 2 is a detail sectional view of the vat or receptacle for regulating the discharge of molten glass into the mold or container and for making such discharge automatically intermittent.

Fig. 3 is a sectional view along the lines III—III of Fig. 1 looking down on my device from above.

Fig. 4 is a detail sectional view of the tamping plate, a mold and the stationary cam for lifting the plungers in the mold.

Fig. 5 is a plan view of the shelf upon which the mold rests during the compression period.

Fig. 6 is an elevation of the bracket supporting the tamping plate.

In the drawings, $a$ represents a glass furnace of approved design and about which there is no novelty. This furnace is provided with an outlet spout $b$ of desired refractory material. The spout $b$ is fitted with a lift valve $c$ hinged at $c^2$ and provided with a manually operable handle $d$. It is apparent that this lift valve $c$ may be operated otherwise if desired. This lift valve is constructed of material adapted to meet the demands of the use to which it will be put. The spout $b$ empties into a discharge passageway $e$ shown in sectional elevation in Fig. 2, which consists of a receptacle of suitable refractory material composed of a floor $e^2$, side walls not shown in the drawings, and an apron $e^3$ rigidly secured thereto and made a part thereof which partially dams up the fluid glass, restraining it to flow underneath such apron through an orifice $e^4$ in a stream of such dimension as is desired. A flap valve $f$ hinged at $f^2$ passes across the orifice $e^4$ and closes the same when it is not desired to permit the fluid glass to flow therethrough. The flap valve $f$ is held in position by means of a spring $f^2$ surrounding spindle $f^3$ and restrained for compression by means of an overhanging ledge $f^4$ through which such spindle $f^3$ passes. This spring $f^2$ must be of sufficient strength to force the flap valve $f$ downward closing the orifice $e^4$ to restrain the flow of molten glass. The flap valve $f$ is lifted, in a manner hereinafter set forth, to permit the fluid glass to pass out from the reservoir into molds or receptacles $g$ designed to receive the same.

These molds $g$ are mounted on a traveling carriage or endless belt which passes over drums or spools $h$. These molds or receptacles may be hinged together as here shown at $g^2$, to form in themselves the endless belt, or they may be individually mounted on said belt separated such distance as may be desired from one another. Such endless chain is carried by drums $h$ driven by mechanism not shown and which is no part of my invention, but which is common to machinery in the art. Each mold or platen $g$ carried by the endless belt is brought under the delivery receptacle $e$ and as it is positioned thereunder it lifts the flap valve *f* by means of an arm *i* which arm terminates at its lower extremity in a roller *i*², which roller passes over and is lifted by a flange or projection *j* carried by such mold or platen *g*. The lifting of the flap valve *f* permits the molten glass to flow out from the discharge passageway *e* into the mold or platen *g*. The arm *i* forms one of a pair of arms, one mounted on each side of the flap valve *f* and projecting downwardly on each side of the receptacle *e* carrying the roller *i*².

To mold or form the molten glass in desired shape in the platen a tamping plate *k* is provided which is carried at the lower end of a plunger *k*². This plunger is mounted in bearings *q* carried in an overhanging frame or bracket *q*², so as to permit intermittent vertical reciprocal movement of said plate at desired predetermined intervals. A shelf *q*³ is likewise carried by such bracket and serves as a table to support the platen *g* in which the molten glass is being compressed during the period of compression. As will be noted the shelf *q*³, shown in Fig. 5, is grooved or recessed longitudinally of the direction of travel of the platens, as indicated at *q*⁴, to permit the travel therethrough of plungers *l* carried by the platens. This is to prevent the downward pressure of the plate *k* during the compression period from being received by the plungers *l* carried on the floor of the platen and to permit such pressure to be resisted directly by the floor of the platen.

The tamping plate *k* is adapted, as heretofore set forth, for vertical movement and is actuated by means of a sharply convex cam *r* which co-acts with the lug *s* carried on the plunger *k*² which supports said plate. Such plate is held in its upraised position by means of an expansion spring *k*³ which spring is compressed during the downward movement of the plunger when actuated by the cam *r*. As the cam passes over the lug *s* the spring again lifts the plunger to its upraised position. The cam *r* is carried by a shaft *i* oppositely from a pulley wheel *t*². This pulley wheel *t*² is operated by means of a belt *n* over a drum pulley *h*². It is apparent that this tamping plate may be otherwise operated, but the means shown herein will serve the purpose.

The endless belt which carries the platens is momentarily halted as each platen containing molten glass rides up on the shelf *q*³ and the glass therein contained is compressed to a desired thickness by the downward action of the tamping plate *k*. Further movement of the endless chain, however, brings the platen carrying the molten glass up on an inclined plane or stationary cam *u* which forces the plungers *l* upward lifting the molten glass from the platen *g* so the same may be carried to the annealing furnace.

During the several foregoing operations it has been necessary to retain the molten glass above a certain temperature and to prevent a too rapid cooling of the mass. This is accomplished, first, by means of a hot blast directed in the form of a sheet by means of a blast pipe *v* on the molten glass as it discharges into each platen. Such blast discharges within an inclosed run way *w* which encircles the moving platens. The discharging of such blast into such inclosed run way serves to retain the temperature of the glass and the temperature of the platens, above that of the atmosphere.

What I claim is:

1. The combination of a reservoir for molten glass, a discharge passageway provided therefor, a flap valve closing the discharge opening of such passageway, a series of traveling glass receptacles carried by an endless belt, adapted to pass under the discharge opening of such passageway, means carried by such flap valve adapted to co-act with means carried by each glass receptacle for raising such flap valve during the passage of the glass receptacle thereunder, means for closing such valve after the passage of the receptacle from under the discharge passageway, means for leveling and smoothing the glass in said molds during the intermittent stoppage and moving of said belt, means for heating such molten glass during its discharge into the glass molds, and means for retaining such heat.

2. The combination of a tank for containing molten glass, a discharge orifice in such tank, a valve closing such orifice, means for opening such valve, a passageway adapted to discharge the glass from such orifice into a series of traveling glass molds forming an endless chain an intermittent valve closing such passageway, means for opening such valve by the positioning of each glass mold thereunder, means for closing such valve after the glass mold has passed from under such discharge passageway, a leveling plate adapted to automatically descend at predetermined intervals leveling the molten glass carried in each glass mold into a plate of uniform thickness, means carried in the bottom of each mold for ejecting the glass plate therefrom as the mold rides over an inclined plane, a hot blast pipe disposed for directing a hot blast against the glass as it discharges into each mold, and heat retaining means covering said traveling glass molds.

3. The combination with a tank for containing molten glass, of an endless chain carrying a series of glass molds, a discharge passageway from said tank adapted to empty molten glass into each mold as it passes thereunder, a valve adapted to normally close such discharge passageway but provided with means for being opened by the positioning of each glass mold thereunder, leveling means adapted for being automatically brought into contact with the molten glass in each mold as said mold passes under such means compressing the molten glass into a plate of uniform thickness, means for ejecting the molten glass from each mold, means for directing a hot blast against the molten glass as it discharges into the molds, and means for preventing the molten glass in the molds from too rapid cooling before the same is lifted therefrom.

4. In a glass molding machine, a reservoir for containing molten glass, a series of glass molds carried in an endless chain, means for discharging molten glass from said reservoir from each mold as it passes successively under such discharge means, means for actuating such discharging means by each glass mold as it comes underneath the discharge orifice, means for leveling and smoothing the molten glass into a plate of uniform thickness while it is in the mold, an inclosed run-way for such endless chain of glass molds, and means for directing the hot blast through the inclosure of this runway on the discharged molten glass as it escapes from the reservoir into the mold.

5. The combination of a molten glass reservoir provided with a discharge passageway, a series of traveling glass receptacles adapted to pass thereunder so that the glass may be discharged therein, means for directing a hot blast on the molten glass passing through said discharge passageway, and a covered run way for such glass receptacles into which such hot blast discharges.

6. The combination of a molten glass reservoir, a discharge passageway for such reservoir, a chain-like series of glass receptacles adapted to be brought underneath such discharge passageway, an inclosure for the run way of such chainlike series of glass receptacles, and means for directing a hot blast through the roof of such inclosure against the discharging stream of molten glass.

In testimony whereof I sign this specification.

HARRY O. BISBING.